July 10, 1956 W. D. ELDERKIN 2,754,156
STAGING BRACKET
Filed July 27, 1953 2 Sheets-Sheet 1
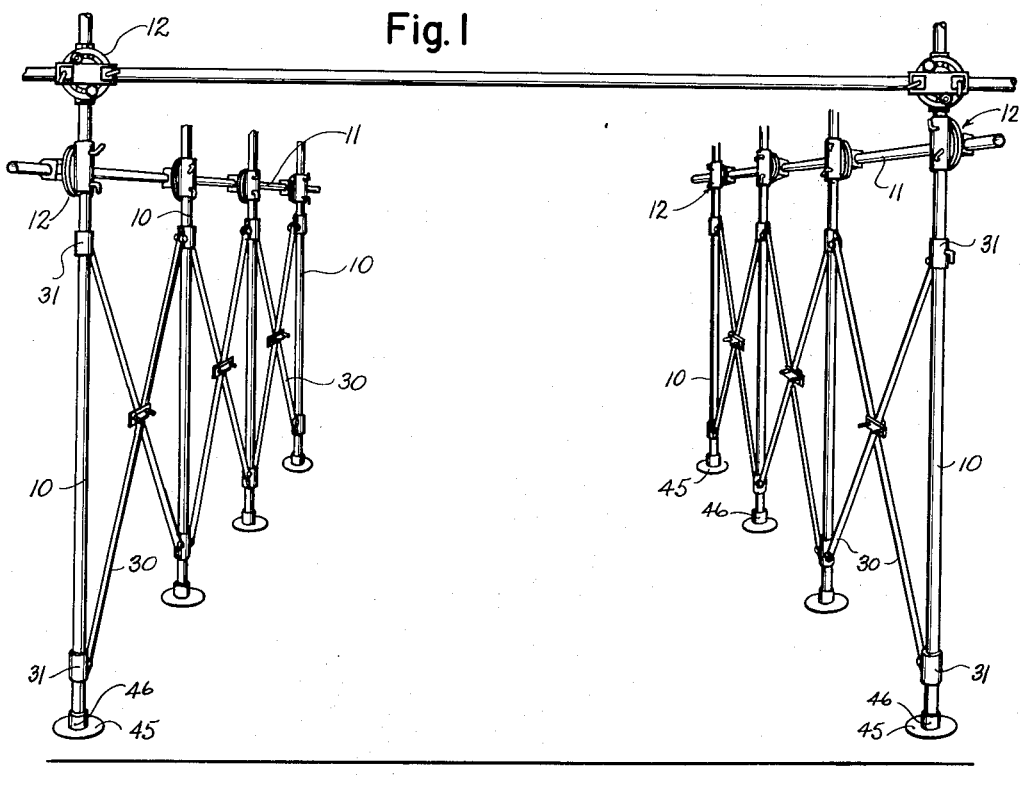
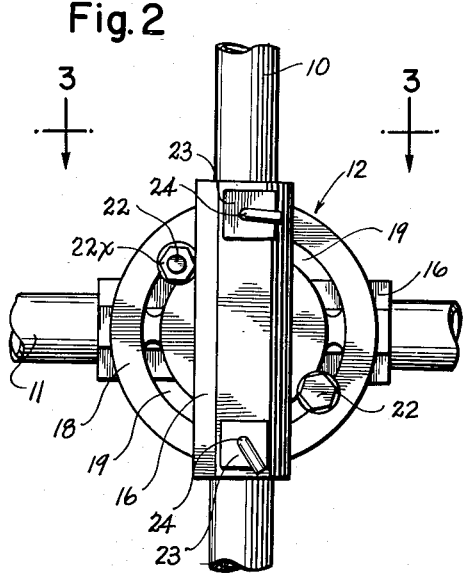
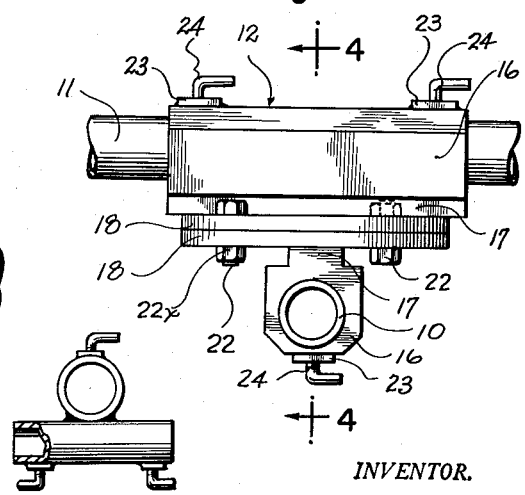
INVENTOR.
William D. Elderkin
BY Cook & Robinson
ATTORNEYS July 10, 1956  W. D. ELDERKIN  2,754,156
STAGING BRACKET
Filed July 27, 1953  2 Sheets-Sheet 2
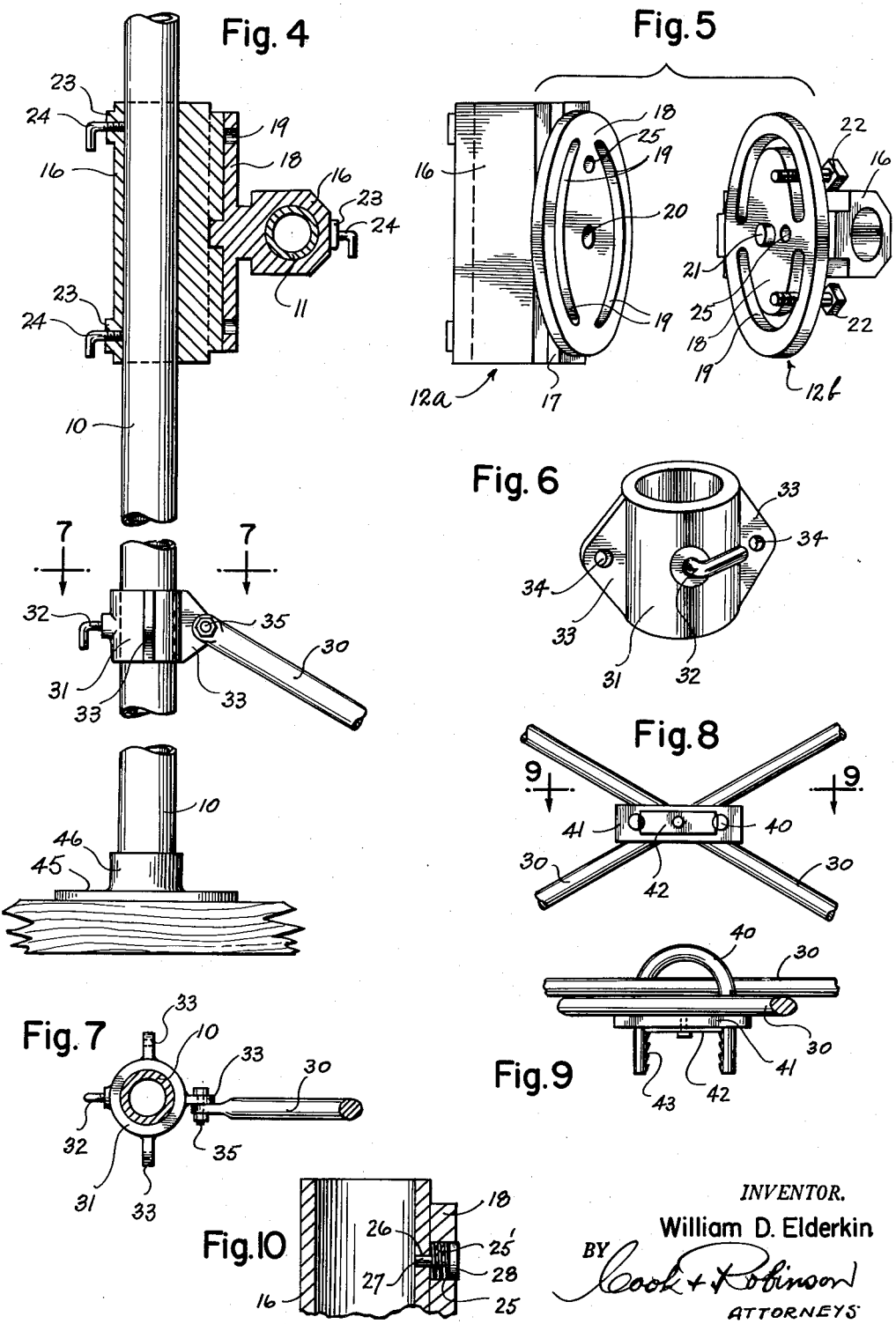
INVENTOR.
William D. Elderkin
BY Cook + Robinson
ATTORNEYS

United States Patent Office 2,754,156
Patented July 10, 1956

2,754,156
STAGING BRACKET

William D. Elderkin, Seattle, Wash.

Application July 27, 1953, Serial No. 370,412

1 Claim. (Cl. 304—40)

This invention relates to staging, or scaffolding and it has reference more particularly to an improved form of staging bracket designed for the connection of vertical and horizontal members of a staging that is constructed of tubular pipe sections or the like.

It is the principal object of the present invention to provide a staging bracket for the above stated purpose that comprises two mating, or paired parts that, respectively, are applicable to two pipe sections that are to be secured together, and are rotatably adjustable relative to each other for the purpose of accommodating the bracket to any desired or required angular relationship of the joined sections, and to provide clamping means associated with the paired parts whereby they may be rigidly held in any position of relative adjustment to which they may be rotated.

It is a further object of this invention to provide a staging bracket of the character and for the purpose previously stated wherein each of the mating or paired parts comprises a tubular sleeve through which a pipe section, constituting a part of a staging, is slidably applicable, and which sleeves are equipped with set screws whereby the contained pipes can be fixed and held against slippage or movement therein; the two mating parts of the bracket being pivotally associated for rotative adjustment on and relative to each other, to accommodate them to the desired or required angular relationship of the contained pipes, and there being easily applied clamping means for securing the two parts in functional relationship and rigidly against relative rotative movement after once being adjusted to the desired relationship.

It is also an object of the present invention to provide means for bracing the staging upon its being erected.

Still further objects of the invention reside in the details of construction of the various parts embodied in the bracket, in their combination and in the mode of use of the bracket in the erection of staging or scaffolding.

In accomplishing the above recited and other objects of the invention, I have provided the improved details of construction, the preferred forms of which are illustrated in the accompanying drawings, wherein:

Fig. 1 is a perspective view of a part of a staging made of tubular pipe sections and having the horizontal and vertical members thereof fixed together by means of adjustable brackets and bracing members embodied by the present invention.

Fig. 2 is a face view of one of the brackets, with vertical and horizontal pipe sections applied thereto and indicating, in dotted lines, a relative rotative adjustment of the two parts of the bracket.

Fig. 3 is a horizontal cross-section taken on the line 3—3 in Fig. 2.

Fig. 4 is a vertical section taken on line 4—4 in Fig. 3.

Fig. 5 is a perspective view showing the mating parts of a bracket in separated relationship.

Fig. 6 is a perspective view of one of the collars employed for the attaching of cross-bracing rods.

Fig. 7 is a cross-section on line 7—7 in Fig. 4.

Fig. 8 is a perspective view showing a form of clasp used to join the cross ties.

Fig. 9 is a cross-section showing the mode of application of the clasp of Fig. 8.

Fig. 10 is a sectional detail showing one of the spring latches used in the bracket.

Fig. 11 shows a bracket of an alternative form.

Referring more in detail to the drawings:

In Fig. 1, a portion of a typical staging, employing brackets of the present form, has been illustrated. It is to be understood, however, that I do not desire that the present bracket be limited in its use to any specific form of staging construction or to any particular place of use but rather that it be employed for any use and in any manner consistent with the intended objects of the invention. In the staging as herein shown, particularly in Fig. 1, the uprights or vertically directed pipe sections are designated by reference numeral 10 and the horizontal sections are designated by numeral 11. The brackets of this invention, as used to connect the pipe sections 10 and 11 are designated in their entireties by reference numeral 12.

The staging members 10 and 11 may be of various lengths. Preferably the vertical members 10 which, for purpose of this description, will be referred to as the posts or uprights are approximately twenty feet long. However, if the staging is to go to a greater height, pipe sections 10 are joined in end to end relationship by use of the present brackets in a manner presently described. Horizontal members 11 would generally be used in lengths most suitable for the particular structure for which the staging was erected; twenty foot lengths are commonly used.

The bracket 12 which characterizes this particular invention is shown in Figs. 2, 3, 4 and 5 to comprise two paired or mating parts, 12a and 12b. These parts are shown in separated relationship in Fig. 5 and it will be observed that the parts are of the same size and substantially alike except for a detail presently explained.

Each of the paired parts comprises a tubular sleeve 16 which may be substantially round in cross-section. The sleeve is herein shown to be formed along one side to its full length with a projecting rib 17 to which a circular disk or plate 18 is symmetrically fixed in a plane that is parallel to the sleeve axis as well shown in Fig. 3.

The disk portions 18 of the bracket may be integrally cast with the corresponding sleeve portions 16 or alternatively the sleeves and disks may be individually formed and then welded or otherwise joined. Fig. 11 illustrates a bracket wherein the sleeves are of cylindrical form and are welded to the disks.

Formed in each disk 18, concentric thereof and equally spaced from its center, are arcuate slots 19—19 which are accessible from the opposite sides of the sleeves for the application thereto of securing devices or clamping bolts as presently explained. The disk of one of the mating parts of each bracket is formed at the center with a socket 20 and the disk of the other is formed at its center with an extending pivot 21 adapted to be rotatably fitted in the socket when these mating parts are fitted flatly together as shown in Figs. 3 and 4, thus to establish and retain the centered and functional relationship of the parts 12a and 12b.

When the parts 12a and 12b have been properly assembled, for example by bringing them into the relationship of Fig. 3, securing and clamping bolts 22 are applied through registering portions of the slots 19 of the flatly engaged disk portions 18 of the two parts, and securing nuts 22x are applied to the bolts. Before rotative adjustment of the parts 12a and 12b has been made, the nuts are left sufficiently loose that the desired or required adjustment can be made.

Each sleeve 16 is provided at the side opposite that on which the disk is applied and near its opposite ends with bosses 23 with set screws 24 threaded therethrough for tightening against a pipe section that may be contained in the sleeve, thus to secure the bracket and pipe against relative movement.

Formed in the inner face of each disk portion 18 is a socket 25 in which a coiled spring 25' is seated. In the bottom of the socket is a hole 26 that opens into the sleeve which is associated with that disk. Contained in the socket, is a pin 27, which at one end extends through the hole 26, and at its other end is equipped with a flat head 28 against which the spring 25 presses. The pin is of such length that when the paired parts of the bracket are finally clamped together, the outer end of the pin will be pressed against the pipe contained in the sleeve thus to hold the bracket in position. Loosening of the clamping bolts permits the springs to urge the disks apart and release the pins from holding contact with the pipes.

These pins 27 do not, however, serve the purpose of the locking screws 24 but supplement them to some extent and will hold the brackets in place until final adjustments have been made. Then the set screws 24 are fully tightened.

Assuming that the mating parts of the brackets 12 are so constructed, they may be used in the erecting of a staging in various ways depending on the requirements of the staging. For example, a required number of brackets 12 may be slipped onto two or more posts 10 by projecting the pipe sections through one of the sleeves of each of the brackets, and then these posts are arranged in a desired spaced relationship. Then a pipe 11 is projected through in the sleeves of the other parts of the brackets as applied to the different posts 10; the mating parts of each bracket, at that time being assembled but loosely held together by the clamp bolts 22 applied through the arcuate slots of the disks portions thereof.

Then the assembled members 10 and 11 are set in position and the horizontal member adjusted to a desired elevation and the brackets secured at that elevation by tightening the set screws 24 against the posts 10. Then the horizontal member 11 is adjusted endwise to a desired location and the set screws 24 of the sleeves in which it is contained are tightened thereagainst. Finally the clamping bolts 22 are drawn tight by means of the nuts 22x thus to secure the mating sections of each bracket tightly together and against any rotative movement relative to each other. In this way the horizontal member and the vertical members are rigidly and securely joined.

If it should be desired to run the ledger members 11 at an incline, this is usually accomplished by fixing the supporting bracket which contains one end of the ledger member to a post 10, and then moving the opposite end of the ledger to the elevation that will give the desired incline, and fixing its supporting bracket at that end to the vertical post. Then if there are intermediate brackets, these are secured to the posts 10, and finally the set screws 24 and clamp bolts 22 of all brackets are tightened.

Cross bracing 30 is here shown in Fig. 1 to be applied between uprights 10. For the attachment of these crossed braces, I provide collars 31 which are adapted to be slipped onto the uprights, or onto the horizontal members at places required. Each collar has a set screw 32 threaded therethrough and adapted to be tightened against the pipe to which the collar is applied. Also, each collar is provided at opposite sides, and also opposite the set screw with wings 33 formed with holes 34. The tie rods 30—30 are crossed and fixed at their ends to collars 31 as applied to spaced posts 10; connection between rods 30 and collars is made by bolts 35 applied through holes in the ends of the tie rods and holes 34 of the collar wings 33. Collar bracing or tie rods 30 may likewise be applied to horizontal members in a like manner.

At the crossing points of tie rods 30—30, I prefer to apply U-shaped clamps 40 of the kind shown in Figs. 8 and 9. Each clamp 40 has a securing plate 41 applied to its leg portions and held in place by a locking plate 42 that is pivoted on plate 41 for rotation to engage its ends in notches 43 formed in the legs of the U-bolt.

If it is desired, the uprights 10 may be equipped with pads 45 at their lower ends, each having a tubular socket 46 fixed on its top surface to contain the lower end of the upright therein.

If an extension of a post 10 or a horizontal member 11 is to be made, the connection is made at one of the brackets. In making such a connection, the adjacent ends of the two pipes are applied to equal extent into opposite ends of a sleeve 16 of the bracket and are secured by tightening the set screws 24 thereagainst.

Brackets of this kind may be made in various sizes, and of any suitable metal. They can be used with tubular pipe or round rods, and modifications in design or shape of parts may be made without departing from the spirit of the invention.

It is to be explained further that in the erection of a scaffold requiring extensions to be joined by pipes 10, it is desirable to employ a number of the rigid brackets of Fig. 11 along with the others. These brackets, which comprise two sleeves crossed at right angles and welded together would necessarily have to be used at places where members 10 and 11 are crossed at right angles. They are used in a manner similar to the use of the adjustable brackets, and will insure rigidity and eliminate and possible collapse or tipping.

Having thus described my invention, what I claim as new therein and desire to secure by Letters Patent is:

A staging bracket comprising paired members, each having a flat, disk-like base portion and a straight tubular member formed integrally therewith diametrically across its outer face to contain a staging member, one of said paired members having a pivot member extended centrally from the inner face of the base portion thereof, and the base portion of the other member having a socket centrally of its inner surface for containing the said pivot member therein when said base portions of the two members are disposed flatly together; each of said base portions having arcuate slots formed therethrough and adapted to register when the parts are assembled face to face, clamp bolts applied through said registering slots and adapted to hold the paired members together and in various positions of adjustment, set screws threaded through walls of the tubular members for the securement of staging sections applied therein, a hole through each of the paired members from the inner face thereof and opening into the corresponding tubular member, a pin contained in each of said holes and said pin being adapted to bear at one end against the inner face of the opposite paired member when said members are assembled and to be projected by the clamping of said paired members together to project into the tubular member thereof to holding contact with a contained staging member, and a spring acting against said pin to urge it from holding contact with the loosening of the clamp bolts.

References Cited in the file of this patent

UNITED STATES PATENTS

| | | |
|---|---|---|
| 566,360 | White | Aug. 25, 1896 |
| 870,696 | Stetler | Nov. 12, 1907 |
| 1,442,582 | Palmer-Jones | June 16, 1923 |
| 1,706,215 | Davidson | Mar. 19, 1926 |
| 1,981,938 | Anderson | Nov. 27, 1934 |
| 2,583,368 | French | Jan. 22, 1952 |